(12) United States Patent
Rickis et al.

(10) Patent No.: US 11,519,299 B2
(45) Date of Patent: Dec. 6, 2022

(54) SLIDING MOUNT

(71) Applicant: Hamilton Sundstrand Corporation, Charlotte, NC (US)

(72) Inventors: Aaron F. Rickis, Feeding Hills, MA (US); Elise N. Zimmerman, Vernon Rockville, CT (US); Gary R. Marconi, New Hartford, CT (US); Glenn Gradischer, Canton, CT (US); August M. Coretto, Manchester, CT (US); Francis P. Marocchini, Somers, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 1165 days.

(21) Appl. No.: 15/852,803

(22) Filed: Dec. 22, 2017

(65) Prior Publication Data

US 2019/0195092 A1    Jun. 27, 2019

(51) Int. Cl.
*F01D 25/28*    (2006.01)
*F02C 7/32*    (2006.01)

(52) U.S. Cl.
CPC ............... *F01D 25/28* (2013.01); *F02C 7/32* (2013.01); *F05D 2220/32* (2013.01); *F05D 2230/64* (2013.01); *F05D 2260/30* (2013.01)

(58) Field of Classification Search
CPC .. F01D 25/28; F05D 2260/31; F05D 2230/64; F16B 5/0241; F16B 5/0266
See application file for complete search history.

(56) References Cited

U.S. PATENT DOCUMENTS

| | | | |
|---|---|---|---|
| 3,776,651 A * | 12/1973 | Peter | F16D 1/09 403/248 |
| 4,523,516 A * | 6/1985 | Foster | F16K 31/1223 251/63.6 |
| 4,720,223 A * | 1/1988 | Neights | B25B 13/481 411/11 |
| 5,031,396 A | 7/1991 | Margnelli | |
| 5,201,625 A * | 4/1993 | Takenouchi | H01R 13/6215 411/369 |
| 5,224,824 A * | 7/1993 | Eng | F01D 25/246 415/173.1 |
| 5,224,825 A * | 7/1993 | Strang | F01D 25/246 415/135 |

(Continued)

FOREIGN PATENT DOCUMENTS

WO      9306343 A1      4/1993
WO      2014137575 A1   9/2014

OTHER PUBLICATIONS

European Search Report for European Application No. 18214764.5 dated Jun. 6, 2019.

*Primary Examiner* — Jonathan P Masinick
(74) *Attorney, Agent, or Firm* — Carlson, Gaskey & Olds, P.C.

(57) ABSTRACT

A mount according to an example of the present disclosure includes a locating pin, a load pin, a fastener, the fastener configured to retain a component on at least one of the locating pin and the load pin, the fastener including a bolt, a mounting boss and a spring, the spring allowing the mounting boss to move with respect to the bolt, and wherein the bolt is held captive in the mounting boss with a captive feature. A gas turbine engine and a method of mounting a component are also disclosed.

13 Claims, 6 Drawing Sheets

(56) References Cited

U.S. PATENT DOCUMENTS

| | | | | |
|---|---|---|---|---|
| 5,474,308 | A * | 12/1995 | Moser | B23B 31/208 |
| | | | | 279/156 |
| 5,984,602 | A * | 11/1999 | Park | F16B 39/284 |
| | | | | 411/154 |
| 6,309,158 | B1 * | 10/2001 | Bellinghausen | F16B 5/0208 |
| | | | | 411/107 |
| 6,783,299 | B2 * | 8/2004 | Meron | H01L 21/68728 |
| | | | | 269/91 |
| 7,179,039 | B2 * | 2/2007 | Schwartz | F16B 5/0241 |
| | | | | 16/2.1 |
| 7,198,445 | B2 | 4/2007 | Kramer | |
| 7,637,110 | B2 * | 12/2009 | Czachor | F01D 25/28 |
| | | | | 415/136 |
| 7,682,117 | B2 * | 3/2010 | Holt | F16B 5/0266 |
| | | | | 411/156 |
| 7,837,435 | B2 * | 11/2010 | Ellis | F01D 5/26 |
| | | | | 415/119 |
| 8,281,603 | B2 | 10/2012 | Johnson | |
| 8,607,577 | B2 | 12/2013 | Ruberte Sanchez et al. | |
| 8,827,614 | B2 * | 9/2014 | Tseng | F16B 5/0208 |
| | | | | 411/107 |
| 9,322,334 | B2 | 4/2016 | Casavant et al. | |
| 9,347,471 | B2 * | 5/2016 | Tseng | F16B 5/0208 |
| 9,551,456 | B2 | 1/2017 | Peters et al. | |
| 10,302,108 | B2 * | 5/2019 | Wu | F16B 2/12 |
| 2003/0222385 | A1 * | 12/2003 | Cai | F16F 1/328 |
| | | | | 267/162 |
| 2005/0025566 | A1 * | 2/2005 | Hasegawa | F16B 5/0233 |
| | | | | 403/408.1 |
| 2005/0129461 | A1 * | 6/2005 | Bruno | F16B 5/0208 |
| | | | | 403/408.1 |
| 2010/0266333 | A1 * | 10/2010 | Oswald | B66C 1/66 |
| | | | | 403/164 |
| 2011/0311333 | A1 * | 12/2011 | Schaser | F16B 43/001 |
| | | | | 411/378 |
| 2013/0154169 | A1 * | 6/2013 | Myers | F01D 25/164 |
| | | | | 267/103 |
| 2014/0062026 | A1 * | 3/2014 | Davis | F16J 15/3436 |
| | | | | 277/358 |
| 2016/0076398 | A1 | 3/2016 | Shteyman et al. | |
| 2019/0242418 | A1 * | 8/2019 | Clark | F16B 5/0258 |
| 2021/0254645 | A1 * | 8/2021 | Corey | F16B 5/0258 |

* cited by examiner

SLIDING MOUNT

BACKGROUND

Gas turbine engines have cases with various components mounted to them. The gas turbine engine cases are subject to thermal stresses, such as those created by expansion and shrinkage due to temperature cycling during various operating conditions of the engine. Gas turbine engine cases also are subject to vibrational loads generated by operation of the engine. These thermal stresses and vibrational loads are also borne by the mounting schemes used to mount components to the gas turbine engine case. Additionally, there are cost and weight considerations for mounting schemes.

SUMMARY

A mount according to an example of the present disclosure includes a locating pin, a load pin, a fastener, the fastener configured to retain a component on at least one of the locating pin and the load pin, the fastener including a bolt, a mounting boss and a spring, the spring allowing the mounting boss to move with respect to the bolt, and wherein the bolt is held captive in the mounting boss with a captive feature.

In a further embodiment according to any of the foregoing embodiments, the spring is one of a wave washer, a belleville washer, and a single-coil wave spring.

In a further embodiment according to any of the foregoing embodiments, the captive feature includes a resilient c-ring on the bolt.

In a further embodiment according to any of the foregoing embodiments, the resilient c-ring is configured to interact with a neck on the mounting boss.

In a further embodiment according to any of the foregoing embodiments, the captive feature includes a threaded portion on the bolt and a corresponding threaded portion on the mounting boss.

A gas turbine engine according to an example of the present disclosure includes an engine case, a component, and a mount configured to attached the component to the engine case, the mount includes a locating pin, a load pin, and a fastener, the fastener configured to retain the component on at least one of the locating pin and the load pin, and wherein the fastener includes a bolt, a mounting boss and a spring, the spring allowing the mounting boss to move with respect to the bolt, and wherein the bolt is held captive in the mounting boss with a captive feature.

In a further embodiment according to any of the foregoing embodiments, the component is an actuator.

In a further embodiment according to any of the foregoing embodiments, the actuator includes a piston that generates a load, and at least one of the locating pin and the load pin are configured to carry the load.

In a further embodiment according to any of the foregoing embodiments, the fastener is configured to carry vibrational loads from an engine in the engine case.

In a further embodiment according to any of the foregoing embodiments, the gas turbine engine includes a retention feature retaining the bolt in the engine case.

In a further embodiment according to any of the foregoing embodiments, the retention feature includes a threaded portion on the bolt and a shoulder on the bolt.

In a further embodiment according to any of the foregoing embodiments, the threaded portion threads into the engine case such that the shoulder abuts the engine case.

In a further embodiment according to any of the foregoing embodiments, the captive feature includes a resilient c-ring on the bolt, and the resilient c-ring is configured to interact with a neck on the mounting boss.

In a further embodiment according to any of the foregoing embodiments, the captive feature includes a threaded portion on the bolt and a corresponding threaded portion on the mounting boss.

A method of mounting a component according to an example of the present disclosure includes retaining a component on at least one of a locating pin and a load pin with a fastener, the fastener including a bolt received in a mounting boss, and capturing the bolt in the mounting boss with a captive feature.

In a further method according to any of the foregoing methods, the method of mounting a component further includes mounting the component onto an engine case with the fastener.

In a further method according to any of the foregoing methods, the method of mounting a component includes aligning the component with the engine case via a locating pin.

In a further method according to any of the foregoing methods, the method of mounting a component includes torqueing a threaded portion of the bolt into the engine case.

In a further method according to any of the foregoing methods, the capturing is accomplished by a threaded portion on the bolt and a corresponding threaded portion on the mounting boss.

In a further method according to any of the foregoing methods, the capturing is accomplished by a resilient c-ring on the bolt and a neck on the mounting boss.

DETAILED DESCRIPTION

Figure 1:
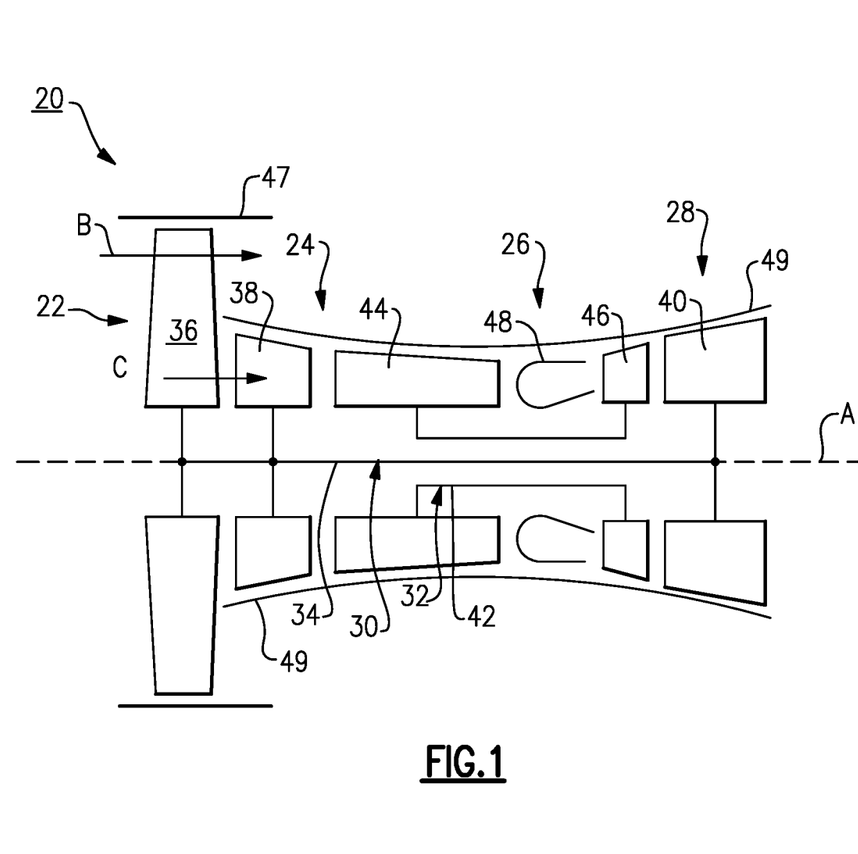
FIG. 1 schematically illustrates a gas turbine engine.

FIG. 1 schematically illustrates a gas turbine engine 20. The gas turbine engine 20 includes a fan section 22, a compressor section 24, a combustor section 26 and a turbine section 28. In the illustrated example, the gas turbine engine 20 is a two-spool turbofan for propulsion of an aircraft. The fan section 22 drives air along a bypass flow path B, while the compressor section 24 drives air along a core flowpath C for compression and communication into the combustor section 26 then expansion through the turbine section 28. Although the example engine 20 is depicted as a two-spool turbofan gas turbine engine, it should be understood that the concepts disclosed herein are not limited to use with turbofans as the teachings may be applied to other types of turbine engines, such as engines having fewer or more than two spools, and industrial and marine applications.

The engine 20 generally includes a low spool 30 and a high spool 32 mounted for rotation about an engine axis A relative to an engine static structure. The low spool 30 generally includes an inner turbine or spool shaft 34 that interconnects a fan 36 having a plurality of fan blades, a low pressure compressor 38 and a low pressure turbine 40. The high spool 32 includes an outer turbine or spool shaft 42 that interconnects a high pressure compressor 44 and a high pressure turbine 46. A combustor 48 is arranged between the high pressure compressor 44 and the high pressure turbine 46. The inner spool shaft 34 and the outer spool shaft 42 are concentric and rotate about the engine axis A.

Airflow delivered to the core flowpath C by the fan 36 is compressed by the low pressure compressor 38 then the high pressure compressor 44, mixed and burned with fuel in the combustor 48, then expanded over the high pressure turbine 46 and the low pressure turbine 40. The turbines 40/46 rotationally drive the respective spools 30/32 in response to the expansion. A fan case 47 at least partially surrounds the fan 36. An engine case 49 at least partially surrounds the spools 30/32. The engine case 49 can be one or more static structures that provide an engine backbone for supporting the compressor section 24, combustor section 26 and turbine section 28. The fan case 47 and engine case 49 can be arranged adjacent to a nacelle assembly to guide airflow relative to the engine 20.

Figure 2:
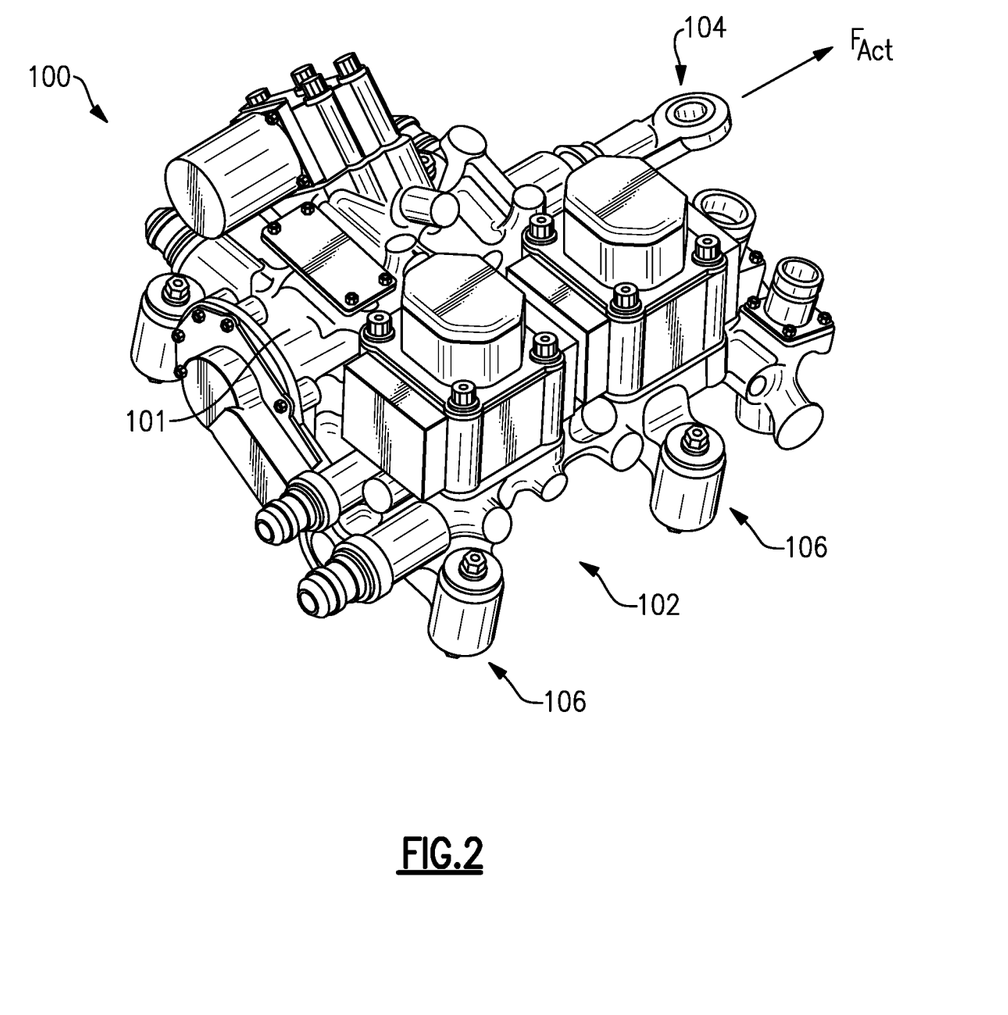
FIG. 2 schematically illustrates an outwardly facing side of a mount.
Figure 3:
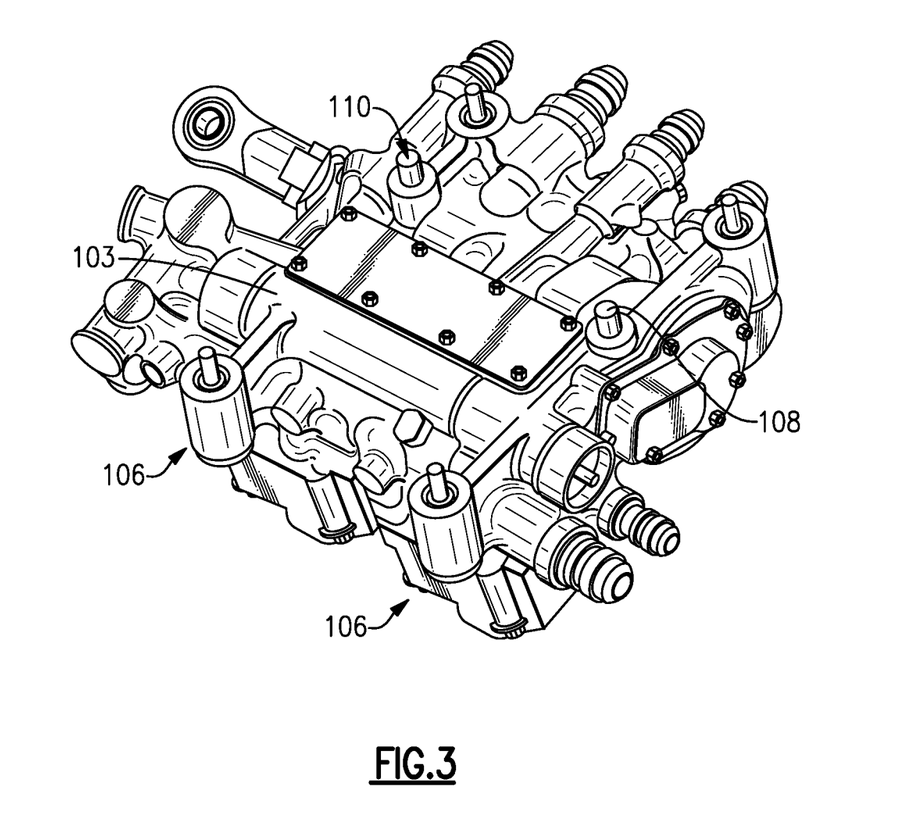
FIG. 3 schematically illustrates an engine facing side of the mount of FIG. 2.

The engine case 49 and/or fan case 47 include various components. Referring to FIGS. 2-3, these components 100 are mounted to the engine case 49 and/or fan case 47 by a mount 102. For simplicity, the components 100 discussed herein will be mounted to the engine case 49. However, it should be understood that the component 100 can be mounted to the fan case 47 by the mount 102 in the same manner discussed herein.

The mount 102 has an outward-facing side 101 (that is, the side that faces away from the engine) which is schematically shown in FIG. 2. The mount 102 has an engine-facing side 103 which is schematically shown in FIG. 3. The mount 102 includes at least one fastener 106, at least locating pin 108, and at least one load pin 110. In the example of FIGS. 2-3, the mount 102 includes four fasteners 106, one locating pin 108, and one load pin 110. However, in other examples, more or less fasteners 106, locating pins 108, and/or load pins 110 can be used. The locating pin 108 aligns the mount 102 and component 100 with the engine case 49. The load pin 110 carries loads generated by the component 100 (for example, where the component 100 is an actuator, as discussed below). In some examples, the locating pin 108 also carries loads generated by the component 100.

The fasteners 106 keep the component 100 engaged on the locating pin 108 and load pin 110. The fasteners 106 also carry vibrational and other miscellaneous loads generated by the component 100 and/or the engine 20.

In the examples of FIGS. 2-3, the component 100 is an actuator, such as actuator that is hydraulically driven. More particularly, the actuator is hydraulically driven by fuel. The actuator 100 includes a piston 104 for transferring motion. The piston 104 generates a force in a direction FACT, which is the load carried at least in part by the locating pin 108 and/or load pin 110, as discussed above. Nonetheless, it should be understood the present disclosure is applicable to other types of components 100.

Figure 4A:
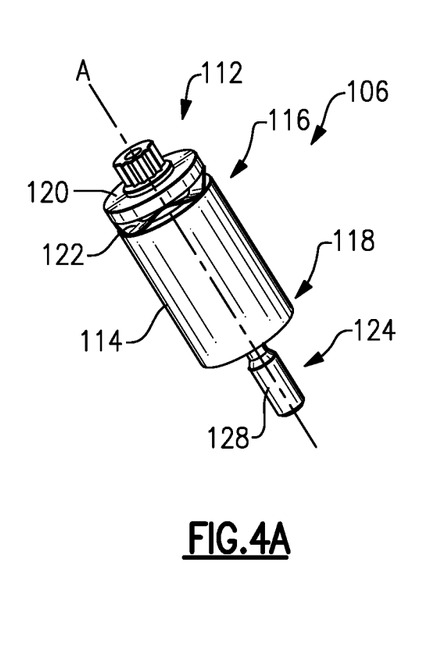
FIG. 4A schematically illustrates a fastener of the mount of FIGS. 2-3.
Figure 4B:
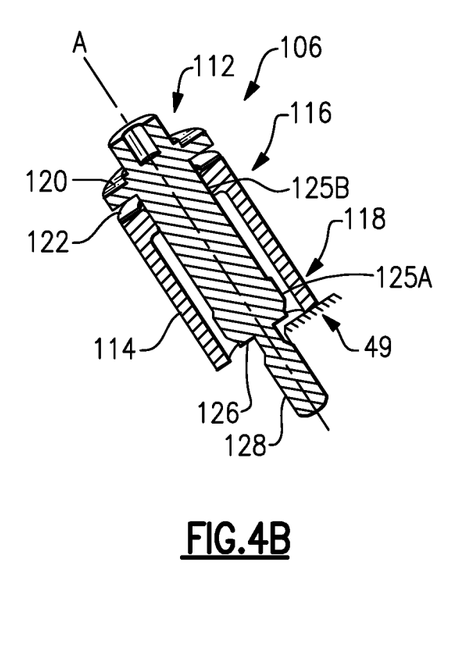
FIG. 4B schematically illustrates a cutaway view of the fastener of FIG. 4A.
Figure 4C:
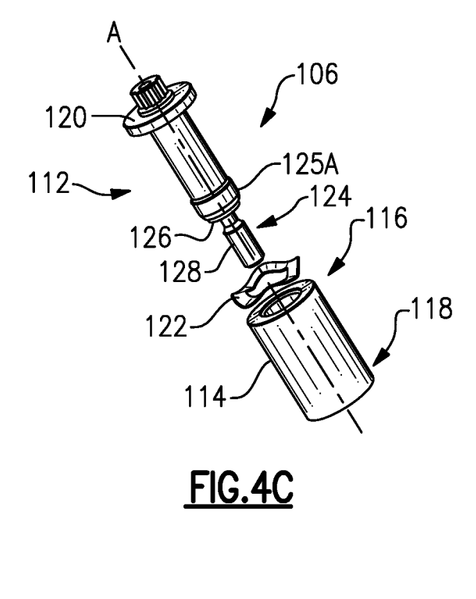
FIG. 4C schematically illustrates an exploded view of the fastener of FIGS. 4A-B.

Referring to FIGS. 4A-C, the fasteners 106 include a bolt 112 that is received in a mounting boss 114. The bolt 112 is rigidly (torqued) secured to the engine case 49 via retention feature 124, described below. This torqueing causes a preload on the bolt 112 which is carried by the retention feature 124, described below.

Figure 5A:
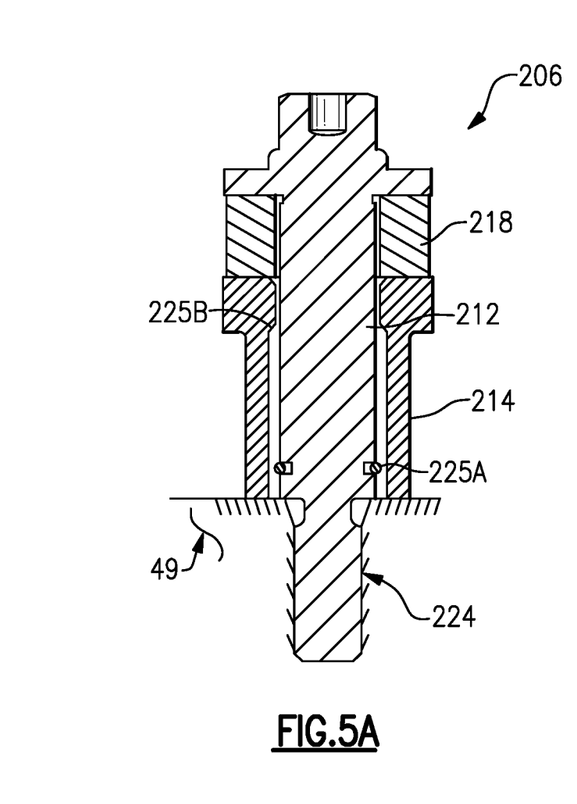
FIG. 5A schematically illustrates an alternate fastener in an uncompressed position.
Figure 5B:
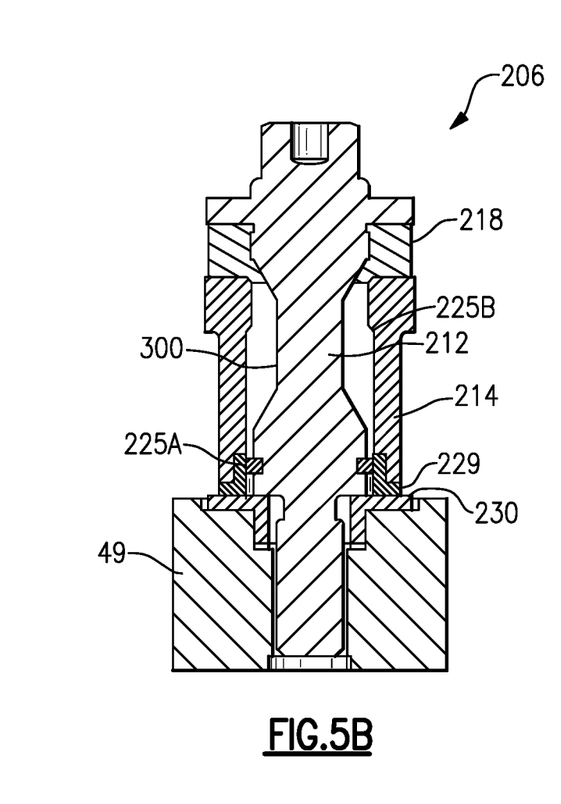
FIG. 5B schematically illustrates the fastener of FIG. 5A in a compressed position.

In the example of FIG. 5B, the bolt 112 includes a reduced diameter portion 300. The reduced diameter portion 300 decreases the weight of the bolt 112 and thus the mount 102.

The mounting boss 114 has a first end 116 and a second end 118 opposite the first end and adjacent the engine case 49. The bolt 112 includes a flange 120. The flange 120 sits adjacent the first end 116 of the mounting boss 114. A spring 122 is between the flange 120 and the mounting boss 114. The spring 122 allows the component 100, and in particular the boss 114, to move axially or slide radially with regards to axis A with respect to the mount 102, and in particular, the bolt 112. The movement or sliding of the boss 114 absorbs at least some of the stresses the mount 102 is subject to. These stresses can be due to vibrational loads from the engine 20, or loads due to thermal mismatch between the component 100, mount 102, and engine case 49, or thermal expansion and shrinkage of the engine case 49 itself. For example, where the component 100 is an hydraulic fuel actuator as discussed above, the hydraulic fuel actuator is cool relative to the engine case 49 by virtue of fuel flow through the actuator. This thermal mismatch may cause the component 100 or mount 102 to expand or shrink relative to the engine case 49, which produces stresses that are absorbed by the fasteners 106. These types of thermal stresses cannot be accommodated by, for example, mounting schemes which simply directly bolt components to an engine case.

The interface between the mounting boss 114 and the engine case 49 are made of and/or coated/plated with materials which provide a suitable wear couple. That is, the materials are selected to provide a wear-tolerant (fretting) surface. Example platings are cobalt-phosphorous or nickel-phosphorous platings. One example wear couple is Inconel/Stellite-6B.

In one example, the spring 122 is a wave washer or belleville washer, but in other examples, the spring 122 is another type of spring. Wave washers and belleville washers typically have higher frequencies than coiled wire-type springs, and are suitable for applications where the engine 20 generates high vibrational frequencies similar to those experienced by coiled-wire type springs. Therefore, wave washers and belleville washers can be more stable in the engine 20 environment than coiled-wire type springs. In one example, the spring 122 is a wave washer or a belleville washer. In a particular example, the spring 122 is adapted for use in an environment subject to vibrational loads of about 100 Gs. In another example, the spring 122 is adapted for use in an environment subject to vibrational loads of about 20 Gs. However, it should be understood that the spring 122 can be selected to withstand higher or lower vibrational loads for the particular application of the mount 102.

The spring 122 is selected to allow the mount 102 to provide the required force to hold the component 100 to the engine case 49 while still allowing the boss 114 to move with respect to the engine case 49. Said another way, the spring 122 is selected to provide a desired preload sufficient in conjunction with retention feature 124 (discussed below) to hold the component 100 on the engine case 49. The required preload depends on the type of component 100. In the case of the hydraulic fuel actuator discussed above, the preload is approximately 2000 pounds (8896 N). The selection of the spring 122 provides design flexibility for the mount 102. That is, the spring 122 can be selected to provide an appropriate preload without providing excessive preload, which could unnecessarily introduce loads on the engine case 49 and the component boss 114.

Opposite the flange 120, the bolt 112 includes a retention feature 124. The retention feature 124 retains the bolt 112 in the engine case 49. In one example, the retention feature includes a shoulder 126 and a threaded portion 128 on the bolt. The threaded portion 128 threads into the engine case 49 such that the shoulder 126 abuts the engine case 49. The torque provided by engagement of the threaded portion 128 with the engine case 49 provides the preload discussed above for connecting the component 100 to the engine case 49.

The mount 102 also includes a captive feature 125A, 125B which holds the bolt 112 and spring 122 captive in the mounting boss 114, but still allows for movement of the mounting boss 114 as discussed above. The captive feature 125A, 125B keeps the bolt 112, spring 122 and mounting boss 114 together, which eases installation of the mount 102 by reducing the concern that parts of the mount 102 will be lost or misplaced. In one example, shown in FIGS. 4B-C, the captive feature includes a threaded portion 125B on the mounting boss 114 and a corresponding threaded portion 125A on the bolt 112. The bolt 112 is installed into the mounting boss 114 by twisting the threaded portion 125A of the bolt 112 through the threaded portion 125B of the mounting boss 114. Continued twisting of the threaded portions 125A, 125B disengages them from one another such that bolt 112 passes through the mounting boss 114 and the shoulder 126 abuts the engine case 49. Once the bolt 112 is installed in the mounting boss 114, it is captive in the mounting boss 114, but the mounting boss 114 can still move with respect to the bolt 112 as discussed above.

FIGS. 5A-E show an alternate fastener 206. The alternate fastener 206 has a bolt 212, a mounting boss 214, a spring 218, a retention feature 224, and a captive feature 225A, 225B. In the example of FIGS. 5A-E, the spring 218 is a single-coil wave spring. In other examples, the spring 218 is one of the other types of springs discussed above.

Figures 5C, 5D:
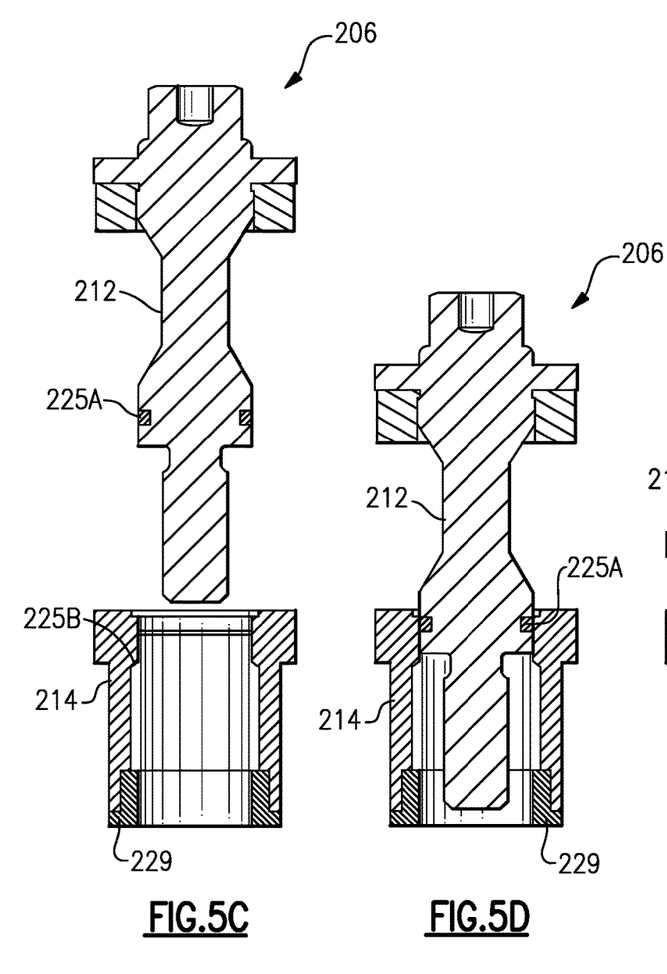
FIG. 5C schematically illustrates the fastener of FIGS. 5A-B during a stage of installation.
FIG. 5D schematically illustrates the fastener of FIGS. 5A-C during another stage of installation.
Figure 5E:
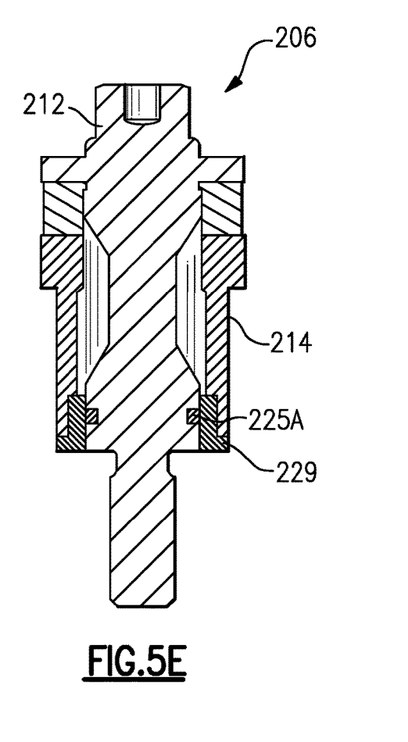
FIG. 5E schematically illustrates the fastener of FIGS. 5A-D during another stage of installation.

In the example of FIGS. 5A-E, the captive feature 225A, 225B is a resilient c-ring 225A on the bolt 212 which interacts with a neck 225B on the mounting boss 224. As shown in FIG. 5D, the resilient c-ring 225A is compressed as it passes through the neck 225B on the mounting boss 214 and due to its resiliency, springs radially outward against an inner diameter of the mounting boss 214. Once the resilient c-ring 225A passes the neck 225B, as shown in FIG. 5E, the bolt 212 is captive in the mounting boss 214, but the mounting boss 214 can still move with respect to the bolt 212 just like the mounting boss 114 and bolt 112 discussed above. In the example of FIG. 5A, the resilient c-ring 225A interacts directly with the mounting boss 214. In a particular example, the mounting boss 214 includes a plating or coating as discussed above to allow the mounting boss 214 to resist wear as it moves with respect to the bolt 212. In the example of FIG. 5B, a bushing 229 in the mounting boss interacts with another bushing 230 in the engine case 49. The bushings 229, 230 are materials that together constitute an appropriate wear couple, as discussed above.

Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A gas turbine engine, comprising:
an engine case; and
a component; and
a mount configured to attached the component to the engine case, the mount including a locating pin, a load pin, and a fastener, the fastener configured to retain the component on at least one of the locating pin and the load pin, and wherein the fastener includes a bolt, a mounting boss and a spring, the spring allowing the mounting boss to move with respect to the bolt, and wherein the bolt is held captive in the mounting boss with a captive feature, the captive feature including a resilient c-ring on the bolt and a neck on the mounting boss, the resilient c-ring configured to be compressed by the neck on the mounting boss when passing the mounting boss and spring radially outward against an inner diameter of the mounting boss after passing the mounting boss.

2. The gas turbine engine of claim 1, wherein the component is an actuator.

3. The gas turbine engine of claim 2, wherein the actuator includes a piston that generates a load, and at least one of the locating pin and the load pin are configured to carry the load.

4. The gas turbine engine of claim 1, wherein the fastener is configured to carry vibrational loads from an engine in the engine case.

5. The gas turbine engine of claim 1, further comprising a retention feature retaining the bolt in the engine case.

6. The gas turbine engine of claim 5, wherein the retention feature includes a threaded portion on the bolt and a shoulder on the bolt.

7. The gas turbine engine of claim 6, wherein the threaded portion threads into the engine case such that the shoulder abuts the engine case.

8. A mount, comprising:
a locating pin;
a load pin; and
a fastener, the fastener configured to retain a component on at least one of the locating pin and the load pin, the fastener including a bolt, a mounting boss, and a spring, the spring allowing the mounting boss to move with respect to the bolt, and wherein the bolt is held captive in the mounting boss with a captive feature, the captive feature including a resilient c-ring on the bolt and a neck on the mounting boss, the resilient c-ring configured to be compressed by the neck on the mounting boss when passing the mounting boss and spring radially outward against an inner diameter of the mounting boss after passing the mounting boss.

9. The mount of claim 8, wherein the spring is one of a wave washer, a belleville washer, and a single-coil wave spring.

10. The mount of claim 8, wherein the bolt includes a reduced diameter threaded portion extending beyond the mounting boss.

11. The mount of claim 10, wherein the bolt includes a flange at a first axial end of the bolt and the reduced diameter threaded portion is at a second axial end of the bolt opposite from the first end.

12. The mount of claim 10, wherein the reduced diameter threaded portion is configured to thread into an engine case to connect the component to the engine case.

13. The mount of claim 8, wherein the spring is arranged between the flange and a first axial end of the mounting boss.

* * * * *